United States Patent [19]

Newlove et al.

[11] Patent Number: 4,480,693

[45] Date of Patent: Nov. 6, 1984

[54] FLUID LOSS CONTROL IN OIL FIELD CEMENTS

[75] Inventors: John C. Newlove; Robert C. Portnoy, both of Houston, Tex.; Donald N. Schulz, Annandale; Kissho Kitano, Fanwood, both of N.J.

[73] Assignee: Exxon Research & Engineering Co., Florham Park, N.J.

[21] Appl. No.: 565,158

[22] Filed: Dec. 23, 1983

[51] Int. Cl.$^3$ ............................................. E21B 33/138
[52] U.S. Cl. ..................................... 166/293; 166/295; 106/90
[58] Field of Search ............... 166/292, 293, 294, 295; 106/90, 314; 252/8.55 R

[56] References Cited

U.S. PATENT DOCUMENTS

| | | | |
|---|---|---|---|
| 3,116,264 | 12/1963 | Wahl | 166/293 X |
| 3,140,269 | 7/1964 | Wahl et al. | 166/293 X |
| 3,359,225 | 12/1967 | Weisend | 252/8.55 R X |
| 3,994,852 | 11/1976 | Adams et al. | 166/293 |
| 4,079,011 | 3/1978 | Tate | 252/8.55 R X |
| 4,258,790 | 3/1981 | Hale | 166/293 |

*Primary Examiner*—Stephen J. Novosad
*Assistant Examiner*—Bruce M. Kisliuk
*Attorney, Agent, or Firm*—Richard E. Nanfeldt

[57] ABSTRACT

The present invention relates to materials which reduce the filtration of fluid into permeable earth formations during cementing processes in the drilling and completing of subterranean wells, particularly wells for the recovery of petroleum resources.

Petroleum well cementing is the process of mixing a slurry of cement, water, and other additives and pumping it down through steel casing to critical points in the oil well annulus around the casing or in the open hole below the casing string. The primary functions of the cementing process are to restrict fluid movement between geological formations and to bond and support the casing. In addition the cement aids in protecting the casing from corrosion, preventing blowouts by quickly sealing formations, protecting the casing from shock loads in drilling deeper wells, and sealing off lost circulation or thief zones.

A common problem in petroleum well cementing is the flow of liquid from the cement slurry into porous earth formations in contact with the cement. This fluid loss is undesirable since it can result in dehydration of the cement slurry, and it causes thick filter cakes of cement solids which can plug the well bore. The fluid lost can damage sensitive formations. Cement fluid loss is particularly a problem in the process known as squeeze cementing.

There is a requirement, therefore, for materials which, when added to the cement formulation, reduce the loss of fluid from the slurry to porous formations.

7 Claims, No Drawings

FLUID LOSS CONTROL IN OIL FIELD CEMENTS

BACKGROUND OF THE INVENTION

1. Field of the Invention

The present invention relates to materials which reduce the filtration of fluid into permeable earth formations during cementing processes in the drilling and completing of subterranean wells, particularly wells for the recovery of petroleum resources.

Petroleum well cementing is the process of mixing a slurry of cement, water, and other additives and pumping it down through steel casing to critical points in the oil well annulus around the casing or in the open hole below the casing string. The primary functions of the cementing process are to restrict fluid movement between geological formations and to bond and support the casing. In addition the cement aids in protecting the casing from corrosion, preventing blowouts by quickly sealing formations, protecting the casing from shock loads in drilling deeper wells, and sealing off lost circulation or thief zones.

A common problem in petroleum well cementing is the flow of liquid from the cement slurry into porous earth formations in contact with the cement. This fluid loss is undesirable since it can result in dehydration of the cement slurry, and it causes thick filter cakes of cement solids which can plug the well bore. The fluid lost can damage sensitive formations. Cement fluid loss is particularly a problem in the process known as squeeze cementing.

There is a requirement, therefore, for materials which, when added to the cement formulation, reduce the loss of fluid from the slurry to porous formations.

2. Description of the Prior Art

A type of fluid loss agent used in oil well cementing consists of a medium molecular weight grade of hydroxyethylcellulose (HEC) which may be employed with or without a dispersant such as condensed naptha-lenesulfonic acid salts. There are several disadvantages to the use of hydroxyethylcellulose as a cement fluid loss control agent, however, among which are that it causes undesirable viscosification and retardation of the cement and that it loses effectiveness in the presence of soluble calcium salts and at elevated temperatures.

Another cement additive employed for control of fluid loss is a copolymer of acrylamide and acrylic acid [L. F. McKenzie, F. M. McElflesh, SPE 1-623,279 (1982)]. Although this material performs well at high temperature and in the presence of soluble calcium salts, it has the undesirable property of strongly retarding cement. This retarding effect increases with increasing temperature, most likely due to the hydrolysis of the unstable amide groups contained in the polymer which accelerates at elevated temperature. Hydrolysis of amide functions produces additional carboxylic acid residues which are credited with cement retarding activity.

Still other materials utilized for the control of fluid loss during well cementing are combinations of polyamines and either lignosulfonate or condensed naphthalenesulfonic acid salts. [L. F. McKenzie, J. V. Eckerts, and P. M. McElfresh, *Oil and Gas J.* 80 (13) 146 (1982)]. These additives are valuable since they cause little viscosification of the cement, and they have little sensitivity to dissolved calcium and moderately high temperatures. The utility of the polyamine-sulfonate combination is somewhat limited, however, by two side effects they produce: retardation and settlement (free water) of the cement.

Mixtures of HEC, polyvinyl pyrrolidone and sodium naphthalene sulfonate have been reported as cement fluid loss additives (Wersend, U.S. Pat. No. 3,132,693 (1964)) as have mixtures of polyvinyl pyrrolidone and sodium naphthalenesulfonate-formaldehyde condensation products (U.S. Pat. No. 3,359,225).

Also complex mixtures of maleic anhydride-N-vinyl-pyrrolidone copolymers with polymers of poly (aryl-vinylbenzyl) alkyl- and hydroalkyl substituted quaternary ammonium bases and salts have been used (Wahl, U.S. Pat. No. 3,140,269 (1964)).

An improved fluid loss additive for well cements consists of 30 to 70 weight percent of N-vinyl-pyrrolidone homopolymer, from about 5 to 19 weight percent of carboxylmethylhydroxyethylcellulose, and the sodium salt of condensed naphthalenesulfonic acid. [B. W. Hale, U.S. Pat. No. 4,258,790 (Mar. 31, 1982)].

Copolymers of N-vinylpyrrolidone and metal salts of styrenesulfonic acid (1) are known, but only as components in oil containing microcapsules used in films. [K. Saeki, H. Matsukawa, U.S. Pat. No. 3,855,146 (1974)].

Despite the art for the control of cement fluid loss which is already known, there exists a need for novel agents capable of improving fluid loss control which are not reduced in utility by the limitations described above.

SUMMARY OF THE INVENTION

Accordingly, the present invention teaches the preparation of copolymers of N-vinylpyrrolidone and metal neutralized styrenesulfonic acid and the use of these copolymers as agents for the control of fluid loss to permeable earth formations from formulations for the cementing of subterranean wells, particularly wells from which are produced natural petroleum resources.

The present invention discloses cementing formulations which comprises: (a) water; (b) a hydraulic cement; (c) from 0.05 to 5.0 wt% based on the weight of the dry cement of a copolymer of N-vinylpyrrolidone and a metal salt of styrene sulfonate, said copolymer ranging in composition from 5 to 95 mole % vinylpyrrolidone and in reduced viscosity in 2% NaCl at 0.5 wt % from 0.5 to 15 dl/g, and (d) optionally other such cement additives as may be required to achieve the desired cementing results.

GENERAL DESCRIPTION OF THE INVENTION

The present invention relates to the preparation of copolymers of N-vinylpyrrolidone and metal salts of styrenesulfonic acid and to the use of the copolymers as agents for the control of fluid loss to permeable earth formations from formulations used for cementing subterranean wells, particularly those wells from which natural petroleum resources are produced.

The copolymers of this invention are copolymers of N-vinylpyrrolidone and metal salts of styrenesulfonic acid. These copolymers are prepared by free radical copolymerization in aqueous solution at 40°-60° C. Typical free radical initiators for the polymerization are azoisobutyronitrile (AIBN), potassium peroxydisulfate, and the like. The copolymers consist of from 5 to 95 mole % of N-vinyl pyrrolidone and 95–5 mole % of a salt of styrene sulfonic acid. Preferred for their better performance as cement fluid loss control agents are the copolymers consisting of 90-35 mole % of N-vinylpyrrolidone and 65-10 mole % styrenesulfonic acid salt.

The cation of the styrenesulfonic acid salt may be any cation which provides a water soluble salt in combination with the styrenesulfonate anion and which causes no undesirable effects in the cementing formulation such as excessive cement acceleration, retardation, free water, thickening or thinning, etc. Some cations which provide styrenesulfonic acid salts suitable for use in these copolymers are lithium, potassium, sodium, triethylammonium, tri(hydroxyethyl) ammonium and the like. These cations represent typical examples of appropriate species, but a wide range of cations may be properly used, and the listing of typical cations is in no way intended to limit the scope of the invention.

The copolymers found useful as agents for the control of cement fluid loss are further characterized by the viscosity which they impart to aqueous solutions. The viscosity parameter chosen to describe the copolymers of this invention is the so-called reduced viscosity of solutions consisting of 2% by weight sodium chloride, 0.5% by weight polymer, and the remainder water. The copolymers of N-vinylpyrrolidone and styrenesulfonic acid salts which are disclosed as part of the subject invention are those having a reduced viscosity of from 0.5 to 15 dl/g.

This invention also discloses a means for controlling the fluid loss to permeable earth formations from formulations used in the cementing of subterranean wells, particularly those wells drilled for the production of oil and gas by use of the copolymers discussed above and subsequently detailed in Examples 1 through 6. The amount of the copolymer utilized in a cement formulation will vary with the particular borehole environment at hand. Geological formation characteristics, borehole properties, borehole depth, contaminants, temperatures and pressures encountered, cement type and other additives, and purpose and method of application of the cementing operation will influence the determination of quantities of the copolymers of this invention to be used in a particular cement formulation to achieve the desired effect. In addition the particular properties of the copolymer will influence the determination of quantities to be used. Because of these factors, it is impossible to specifically state nominal usage levels under all environments or conditions. Those skilled in the art of subterranean well cementing will be able to easily determine needed quantities of the copolymers for cement fluid loss control by testing formation characteristics, formation temperatures and pressures, and cement formulation characteristics, and by otherwise assessing the fluid loss characteristics required of the cement formulation. Nevertheless, it can be stated that a treatment rate of 0.2% to 5% (by weight based on dry cement weight) of the copolymer should be appropriate. It is possible that under some circumstances as little as 0.05% or as much as 5% of the copolymer would be required.

The oil well cements employed in the instant invention are API classification cements—A, B, C, D, E, F, G, and H, pozzolanic cements, pozzolan-lime cements, resin or plastic cements, gypsum cements, diesel oil cements, expanding cements such as API classification cements K, and M, calcium aluminate cements, and latex cements.

The copolymers prepared and used according to this invention may be added to the cement slurry in a variety of ways. They may be applied in a solid form either being premixed with the cement before it is added to water or the solid polymers may be added to the cement water slurry. Alternatively, the copolymers may be applied as aqueous solutions to the dry cement or cement slurry. In the latter cases the water included in the copolymer solution replaces an equal amount of water normally included in the cement slurry.

The amounts of water and cement contained in the subject cementing compositions which include the copolymers of N-vinylpyrrolidone and styrenesulfonic acid salts are highly dependent on the type of cement being used, the other additives being used in the cementing formulation, the borehole conditions and the techniques being used to apply the cement formulation to the borehole. Those skilled in the art of borehole cementing will by consideration of these factors be able to determine the proper cement slurry formulation which will maximize benefits from inclusion of the copolymers of this invention.

A variety of other additives may be used in a cement formulation treated with the copolymers of this invention. For example, cement hardening retarders, hardening accelerators, materials to lower or raise the density of the slurry, lost-circulation-control agents, friction reducers, stabilizers for high temperature strength, etc. may all be used together with this polymer. This list of formulation ingredients which might accompany the polymer of this invention in a cement slurry is meant to be exemplary, but in no way are the accompanying materials limited to those mentioned herein. These and other cement additives may be combined with the subject copolymer as it is determined appropriate by workers skilled in the well cementing art.

The copolymers, cement formulations, and processes described herein as embodiments of the subject invention represent substantial improvements to the art of subterranean well cementing. As compared to the materials and methods known previously for the control of fluid loss in well cementing formulations, use of the subject copolymers is advantageous in several respects. Unlike many of the previously known compositions, the copolymers described herein are fully active fluid loss control agents alone and do not require any other additive or coagents like HEC or dispersants in the cement formulation in order to display full fluid loss control activity. They have remarkable thermal stability and provide excellent fluid loss control at temperatures greater than 200° F. without many of the undesirable side effects common to other cement fluid loss control agents. The subject copolymers cause little thickening of the cement slurry, little retardation of the cement thickening and no increase in fre water. Thus, these materials represent a broadly applicable, general purpose cement fluid loss control treatment, of the type needed for the difficult cementing environments more and more commonly encountered in today's well drilling situations.

DETAILED DESCRIPTION OF THE INVENTION

The following examples will further illustrate the novel qualities of the additive compositions and processes of the present invention without in any way limiting the scope of this invention.

EXAMPLE 1: SYNTHESIS OF COPOLYMERS OF SODIUM STYRENE SULFONATE (SSS) AND N-VINYLPYRROLIDONE (NVP)

Copolymer (10186-11)

In a flask, to 300 ml of distilled water, purged with $N_2$ for 1 hour at 60° C., freshly distilled N-vinylpyrrolidone (NVP) (7.74 g) and recrystallized sodium styrene sulfonate (SSS) (42.26 g)[2] were added and dissolved. After sparging the solution with $N_2$ for an additional 1 hour, 0.10 g of azeisobutyronitrile (AZBN) was added.

The solution became thick in 20 hours at 60° C. The resulting copolymer was purified by precipitation from a large volume of acetone.

Yield: 72.1% (based on weight of monomers). Copolymer composition; NVP/SSS=15.3/84.7 mol/mol. Viscosity: 3.6 cps at 0.42% in 2% NaCl aq. soln.

Copolymer (10186-12)

NVP (13.74 g) and SSS (32.33 g) were used in the same procedure as described for 10186-11.

Yield; 76.8%. Copolymer composition; NVP/SSS=36.2/63.8 mol/mol. Viscosity 3.1 cps at 0.41% in 2% NaCl aq. soln.

These copolymers still contained 7–8% $H_2O$ by weight even after 72 hours drying in vacuo at 60° C.

Other copolymers prepared similarly are described in Table 1.

TABLE 1
COPOLYMERIZATION OF NVP AND SSS IN WATER AT 60° F. BY AIBN, 20 HR

| NVP/SSS in Feed (Mol/Mol) | $[M]_o^{(c)}$ $[I]_o$ | Yield[a] (%) | NVP/SSS[b] in Copolymer (mol/mol) | [ ] $H_2O^{(a)}$ | sp/c[a] in NaCl (dl/g) | [ ] 2% NaCl |
|---|---|---|---|---|---|---|
| 95/5 | 32 | 24.4 | 89.4/10.6 | | | |
| 90/10 | 100 | 43.3 | 79.6/20.4 | | 2.9 | |
| 80/20 | 28 | 81.6 | 82.9/17.1 | 96 | 5.1 | 3.1 |
| 70/30 | 27 | 87.0 | 71.2/28.8 | | 5.2 | 2.5 |
| 44/56 | 21 | 76.8 | 36.2/63.8 | | 5.8 | |
| 25/75 | 20 | 72.1 | 15.3/84.7 | 140 | 7.2 | |

[a] Yields and viscosities were calibrated using water content determined by E. A. and TGA.
[b] Copolymer compositions were determined by elemental analysis data.
[c] Monomer/Initiator.

EXAMPLE 2: THERMAL GRAVIMETRIC ANALYSIS (TGA)

TGA analysis showed that after loss of volatiles (e.g. water) the present copolymers are stable up to >400° C. under $N_2$. The stabilities of these polymers increase somewhat with increasing sodium styrene sulfonate content. (Table 2).

TABLE 2

| NVP/SS Na | Major Weight Loss (TGA) ($N_2$) |
|---|---|
| 96.1/3.9 | >400° C. |
| 91.4/8.6 | >400° C. |
| 82.9/17.1 | >400° C. |
| 71.2/28.8 | >400° C. |
| 36.2/63.8 | >400° C. |
| 15.3/84.7 | >400° C. |

The procedure for testing the copolymers of this invention for the control of cement fluid loss consists of formulating cement slurries containing the polymers and measuring the filtration of fluid from the slurries and other properties according to slight variations of the American Petroleum Institute (API) test described in API Specification for *Materials and Testing for Well Cements* (1982) (Specification 10).

EXAMPLE 3

Tests were performed to show the ability of the subject copolymers to control fluid loss from cement slurries.

For each test sample 860 g of API Class H cement (Lone Star Industries; Pasadena, Tex.), and 327 g of tap water, were mixed at high speed in a 1 qt capacity Waring Blendor for 35 seconds. Then 7.14 g (0.6% based on total slurry weight and 100% active polymer) of candidate fluid loss control material was added, and the slurry was aged at 80° F. with paddle stirring for 20 minutes.

For measurement of fluid loss, the slurry was transferred to a Bariod Low Pressure Filter Press (Model 311, NL Baroid/NL Industries, Inc., Houston, Tex.). The fluid loss was measured according to API Specification 10, Appendix F (1982) at 100 PSI differential pressure and 80° F. In those cases where complete dehydration of the cement occurred before the 30 minute test period had expired the fluid loss was extrapolated to 30 minutes using the relationship $$FL_{30} = FL_T \frac{(\sqrt{30})}{T}$$

where
FL30 = extrapolated 30 min. fluid loss in ml
FLT = fluid loss for time T in ml
T = duration of test until complete cement slurry dehydration in min.

The fluid loss values obtained in this way are denoted by an asterisk (*).

The test results given in Table 3 demonstrate the significant control of cement fluid loss afforded by polymers of this invention.

TABLE 3

| Polymer Sample No. | Fluid Loss, ml |
|---|---|
| None | 279* |
| 10186-11 | 9.5 |
| 10186-12 | 7.0 |
| 10186-97k28 | 44 |
| 10186-38k13 | 72* |
| 10186-96k27 | 31 |
| 10520-032 | 27 |
| 10520-033 | 42 |
| 10520-023 | 13 |
| 10520-025 | 9.2 |
| 10520-027 | 22 |
| 10520-30 | 11 |
| 10520-31 | 13 |
| 10520-76 | 25 |
| 10520-77 | 31 |
| 10520-78 | 34 |

TABLE 3-continued

| Polymer Sample No. | Fluid Loss, ml |
|---|---|
| 10520-79 | 24 |

The data presented in Table 5 verifies that the materials of this invention do not significantly affect the rheological properties of cement slurries containing them at low shear rate. Of course, there is some increase at high shear rate.

TABLE

| | Rheology of Cement Slurries | | | | | |
|---|---|---|---|---|---|---|
| | Shear Stress (lb/100/ft$^2$) at Shear Rates of | | | | | |
| Polymer Sample No. | 5.1 sec$^{-1}$ | 10.2 sec$^{-1}$ | 170 sec$^{-1}$ | 341 sec$^{-1}$ | 511 sec$^{-1}$ | 1022 sec$^{-1}$ |
| None | 20 | 30 | 105 | 140 | 170 | 220 |
| 10520-30 | 25 | 40 | 760 | 935 | 1120 | 1425 |
| 10520-30 | 20 | 35 | 495 | 1070 | >1500 | >1500 |
| 10520-31 | 10 | 75 | 315 | 730 | 1075 | >1500 |

EXAMPLE 4

High temperature, high pressure fluid loss tests were conducted to demonstrate the ability of the polymers of this invention to control cement fluid loss under adverse conditions. The cement samples were prepared exactly as in Example 3. The test was performed using a Baroid High Pressure High Temperature Filter Press (Model 387, NL Baroid/NL Industries, Inc.; Houston, Tex.). The fluid loss was measured according to API Specification 10, Appendix F (1982) at 1,000 PSI differential pressure and temperature ranging from 80° F. to 250° F.

Results were recorded as in Example 3 and were corrected to represent filtration through the standard 7.1 sq in filtration area by multiplying the reading obtained by 2.0.

The results in Table 4 demonstrate the excellent control of cement fluid loss provided by polymers of this invention even at high pressures and at high temperature and pressure combinations.

TABLE 4

| A. High pressure, (1,000 PSI) | |
|---|---|
| Polymer Sample No. | Fluid Loss, ml |
| None | Immediate dehydration; unmeasurable |
| 10520-25 | 30 |
| 10520-30 | 36 |
| 10520-31 | 50 |

| B. High temperature, high pressure (1,000 PIS; 80–250° F.) | | |
|---|---|---|
| Polymer Sample No. | Temperature °F. | Fluid Loss, ml |
| 10520-25 | 80 | 30 |
| 10520-25 | 150 | 64 |
| 10520-25 | 200 | 220* |
| 10520-25 | 250 | Immediate dehydration, unmeasurable |

EXAMPLE 5

A test was conducted to show the small effects of the subject copolymers upon the rheological properties of cement slurries, especially at low shear rate. Cement slurries containing copolymers selected from the subject materials were prepared exactly as described in Example 3. The rheological properties of these samples were determined at 80° F. using a Fann VG Meter (Model 35A; No. 5 Torsion Spring; Fann Instrument Operations; Magcobar/Dresser; Houston, Tex.), according to the instructions in API Specification 10, Appendix H (1982).

EXAMPLE 6

A test was performed to show the lack of effect of the copolymers of this invention upon the tendency of solid material to settle from cement slurries containing them (free water content). Each cement slurry was prepared as described in Example 3. After the 20 min. paddle stirred aging period, the slurry was again mixed for 35 sec. at high speed in a Waring Blendor. The slurry was then used to fill a 250 ml graduated glass cylinder having a graduated length of 240 mm. After the cylinder stood quiescent for 2 hours the supernatant water was measured. This procedure is similar to but slightly simpler than that described in API Specification 10, Appendix K.

The results recorded in Table 4 attest to the lack of effect on cement slurry free water exerted by the polymers described here.

TABLE 6

| Polymer Sample No. | Free Water, ml |
|---|---|
| None | 5 |
| 10520-23 | nil |
| 10520-30 | nil |
| 10520-31 | nil |

What is claimed is:
1. An aqueous slurry which comprises
   (a) a cement; and
   (b) about 0.05 to 5.0 wt% of a copolymer of N-vinyl-pyrrolidone and a salt of styrene sulfonic acid based on the dry weight of said cement;
   (c) water, said cement and said copolymer being dispersed in said water to form said aqueous slurry.
2. A slurry according to claim 1, wherein said copolymer has about 35 to about 90 mole % of N-vinylpyrrolidone.
3. A slurry according to claim 2, wherein said salt of said styrenesulfonic acid is water soluble.
4. A process according to claim 1 wherein said salt of said styrenesulfonic acid is sodium styrene sulfonate.
5. A fluid loss control process which comprises the steps of:
   (a) forming an aqueous slurry of water, a cement, and a copolymer of N-vinyl-pyrrolidone and a salt of styrene sulfonic acid; and
   (b) pumping said aqueous slurry into a well.
6. A process according to claim 5, wherein said copolymer has about 35 to about 90 mole % of N-vinylpyrrolidone.
7. A process according to claim 6 wherein said salt of said styrenesulfonic acid is water soluble.

* * * * *